United States Patent [19]
Bello et al.

[11] Patent Number: 6,128,755
[45] Date of Patent: Oct. 3, 2000

[54] FAULT-TOLERANT MULTIPLE PROCESSOR SYSTEM WITH SIGNATURE VOTING

[75] Inventors: Stephen Edward Bello, Kingston, N.Y.; Kien Anh Hua, Oviedo, Fla.; Jih-Kwon Peir, Fishkill, N.Y.

[73] Assignee: International Business Machines Corporation, Armonk, N.Y.

[21] Appl. No.: 08/295,493

[22] Filed: Aug. 25, 1994

Related U.S. Application Data

[63] Continuation of application No. 07/845,973, Mar. 4, 1992, abandoned.

[51] Int. Cl.$^7$ .................................................... G01R 31/28

[52] U.S. Cl. .......................... 714/715; 395/575; 714/751

[58] Field of Search .......................... 371/22.4, 36, 68.3; 714/715, 751; 395/575; 364/268.9, 269.1

[56] References Cited

U.S. PATENT DOCUMENTS

| | | | |
|---|---|---|---|
| 3,356,837 | 12/1967 | Raymond | 235/153 |
| 4,569,015 | 2/1986 | Dolev et al. | 364/200 |
| 4,583,222 | 4/1986 | Fossum et al. | 371/16.1 |
| 4,649,384 | 3/1987 | Sheafer et al. | 340/825.03 |
| 4,709,325 | 11/1987 | Yajima | 395/575 |
| 4,740,895 | 4/1988 | Sargent et al. | 359/575 |
| 4,751,702 | 6/1988 | Beier et al. | 371/9.1 |
| 4,807,228 | 2/1989 | Dahbura et al. | 371/9.1 |
| 4,849,978 | 7/1989 | Dishon et al. | 371/10.1 |
| 4,853,843 | 8/1989 | Ecklund | 364/200 |
| 4,965,717 | 10/1990 | Cutts, Jr. et al. | 364/200 |
| 5,084,816 | 1/1992 | Boese et al. | 395/575 |
| 5,136,704 | 8/1992 | Danielsen et al. | 395/575 |
| 5,151,981 | 9/1992 | Westcott et al. | 395/375 |
| 5,222,065 | 6/1993 | Krogmann | 395/183.14 |
| 5,305,325 | 4/1994 | Roos | 371/3 |

OTHER PUBLICATIONS

McGill et al., "Fault Tolerance in Continuous Process Control," IEEE Micro, pp. 22–33, Dec. 1984.

Wensley et al. "SIFT: Design and Analysis of a Fault–Tolerance Computer for Aircraft Control," Proc. IEEE, vol. 66, No. 10, pp.1240–1255, Oct. 1978.

Gray, J., The Transaction Concept: Virtues and Limitations, Proc. of VLDB, pp. 144–154, 1981.

Garcia–Molina et al., "Applications of Byzantine Agreement in Database Systems," ACM Trans. Database Syst., vol. 11, No. 1, pp. 27–47, Mar. 1986.

Pittelli et al. "Reliable Scheduling in a TMR Database System," ACM Trans. on Computer Syst., vol. 7, No. 1, pp. 25–60, Feb. 1989.

Rao et al., *Error–Control Coding for Computer Systems*, Prentice Hall, 1st edition, pp. 67–86, 1989.

McCluskey E.J., Built–In Self–Test Techiques, IEEE Design and Test, vol. 2, No. 2, pp. 21–28, Apr. 1985.

(List continued on next page.)

*Primary Examiner*—Robert W. Beausoliel, Jr.
*Assistant Examiner*—Pierre E. Elisca
*Attorney, Agent, or Firm*—Lynn L. Augspurger, Esq.; Heslin & Rothenberg, P.C.

[57] ABSTRACT

A multiprocessor computer system and associated method having processing error detection capability is disclosed for error-free processing of an instruction set. The instruction set is replicated and processed substantially in parallel through a plurality of processing nodes of the computer system. Each processing node collects a compressed hardware signature commensurate with and derived from the execution of the instruction set. Subsequent instruction set processing, the collected hardware signatures from each processing node are compared and the presence or absence of a processing error is determined with reference to a predetermined voting scheme. Processing of the instruction sets through the plurality of processing nodes is typically asynchronous with synchronization occurring subsequent each processor's execution of the instruction set, such that each processor can be driven by an independent clock.

53 Claims, 6 Drawing Sheets

OTHER PUBLICATIONS

Perkins et al., "Design for In–Situ Chip Testing with a Compact Tester," Digest of Papers 1980 Test Conf., pp. 29–41, Nov. 1980.

Neches, P., Dr., "The Anatomy of a Data Computer System," IEEE, Teradata Corporation, pp. 252–254, 1985.

J. Wakerly, *Error Detecting Codes, Self–Checking Circuits and Applications*, New York: North–Holland, 54–60, 1978.

R.A. Frohwerk, "Signature Analysis: A New Digital Field Service Method," Hewlett–Packard J., pp. 2–8, May 1977.

Waicukauski et al., "A method for Generating Weighted Random Test Patterns," IBM J. Res. Development, vol. 33, No. 2, pp. 149–161, Mar. 1989.

fig. 1 fig. 2 fig. 3 fig. 4 fig. 5 fig. 6 fig. 7

FAULT-TOLERANT MULTIPLE PROCESSOR SYSTEM WITH SIGNATURE VOTING

This application is a continuation of application Ser. No. 07/845,973, filed Mar. 4, 1992, now abandoned.

TECHNICAL FIELD

This invention relates in general to computer systems, and more particularly, to a computer network having multiple processing nodes with hardware signature collection and voting capabilities for error-free processing of instruction sets.

BACKGROUND ART

As the speed of microprocessors continues to approach the performance level of mainframe computers, there is increasing interest in developing micro-structure special purpose machines to off-load some of the well established mainframe applications, such as database processing. Although massively parallel structures provide much higher system availability then mainframes, a significant criticism against such systems is that adequate hardware error detection capability is unavailable for todays microprocessor. Since microprocessor chip space is crucial to the performance of VLSI chips, it is impractical to employ totally self-checking circuits, such as those commonly used in mainframe processors. Several attempts have been made to address this error detection issue.

Perhaps the most common technique used in fault-tolerant systems is the simple physical replication of processing hardware. Advances in very large scale integrated (VLSI) circuits and the advent of very inexpensive microprocessors make hardware replication an even more desirable, practical approach to implementing a fault-tolerant system. Highly reliable digital processing is achieved in various computer architectures employing redundancy. For example, triple module redundancy (TMR) systems employ three CPUs to execute the same instruction stream, along with separate main memory units and separate I/O devices. The CPUs duplicate functions so that if one element fails, the system can continue to operate. (For further information on TMR systems, see U.S. Pat. No. 4,965,717, entitled "Multiple Processor System Having Shared Memory With Private-Write Capability," and/or a W. McGill et al. article, entitled "Fault Tolerance in Continuous Process Control," IEEE Micro, pp. 22–33, December, 1984.) A drawback to TMR system processing is that the individual replicated modules must operate in instruction cycle synchrony, which means that they must share a common clock to closely synchronize the replicated processes. Because a single clock drives each replicated process, clock failure is devastating to operation of the system, i.e, would define a single-point failure.

Another solution to improving fault-tolerance within a multi-processor system environment is to use a software data collection and voting technique, for example, following processor completion of each instruction (see Wensley et al., "SIFT: Design and Analysis of a Fault-Tolerant Computer for Aircraft Control," Proc. IEEE, Vol. 66, No. 10, pp. 1240–1255, October 1978). The advantage to such a software data collection and voting approach is that each processor executes an identical application task but is driven by an independent clock so that only loose synchronization between processors is maintained. Each processor's resultant data is broadcast to the other processors, where the data is then voted on using a predefined software routine. Because this approach utilizes the actual resultant data from each processor, and is typically implemented subsequent each instruction execution, a significant drawback is the extensive communications overhead required for its implementation. The technique essentially ignores communication and computation overhead.

Thus, a novel approach to error detection in a multiprocessor distributed computing system is needed, and in particular, such an approach which can be asynchronous and which minimizes communication and computation overhead between and among the multiple processors of the system. The solution presented herein utilizes signature collection and analysis.

Signature analysis with shift registers has been used in the testing and manufacturing of VLSI chips for many years (see, for example, R. A. Frohwerk, "Signature Analysis: A New Digitial Field Service Method," Hewlett-Packard Journal, pp. 2–8, May 1977). Briefly, in this environment signature analysis is used to compress a large data stream of information to be tested into a simple unique signature to reduce the complexity of testing computations. This signature analysis concept is adopted and modified pursuant to the present invention for the multiple processing system environment.

DISCLOSURE OF INVENTION

Briefly summarized, in one aspect the present invention comprises a multiprocessor computer system with processing error detection capability for error-free processing of an instruction set. The multiprocessor system includes a plurality of processors, each processor being coupled to independently process the instruction set. Each one of a plurality of hardware signature generation means is associated with a respective one of the plurality of processors for generating a compressed hardware signature contemporaneous with and based on the processor's processing of the instruction set. Voting means is coupled to receive each of the generated hardware signatures for comparing the signatures for an error condition. An error condition is identified by the voting means if a predefined comparison failure is detected between the received signatures. Numerous additional multiprocessor computer system details are also described and claimed.

In another aspect, the present invention comprises a fault-tolerant instruction set processing method which utilizes multiple processing systems. The processing method includes the steps of: replicating and processing the instruction set through each of the multiple processing systems; collecting a compressed hardware signature from each of the processing systems as the systems independently process the replicated instruction set; and subsequent all processing of the instruction set, voting based upon the collected signatures to identify the presence or absence of a process error condition. Again, numerous process enhancements are also described and claimed.

To summarize, a novel error detection scheme for a multiple processor system is provided. The fault-tolerant system described herein utilizes compressed signature collection and voting techniques to ensure process integrity. Preferably, only one vote per process instruction set is utilized. Consequently, the amount of comparison and communication overhead required is reduced significantly. Because the multiple processor system utilizes loosely coupled asynchronous processing nodes, the probability of a time-correlated failure occurring is diminished. Specifically, there is no common clock left unprotected to expose the system to a single-point failure. Error detection based on processed instruction sets provides superior error identification efficiency in comparison with most prior techniques, such as a chip-level voting error detection approach.

BRIEF DESCRIPTION OF DRAWINGS

These and other objects, advantages and features of the present invention will be more readily understood from the following detailed description of certain preferred embodiments of the present invention, when considered in conjunction with the accompanying drawings in which.

BEST MODE FOR CARRYING OUT THE INVENTION

Reference is now made to the drawings in which the same reference numbers are used throughout the different figures to designate the same or similar components.

Figure 1:
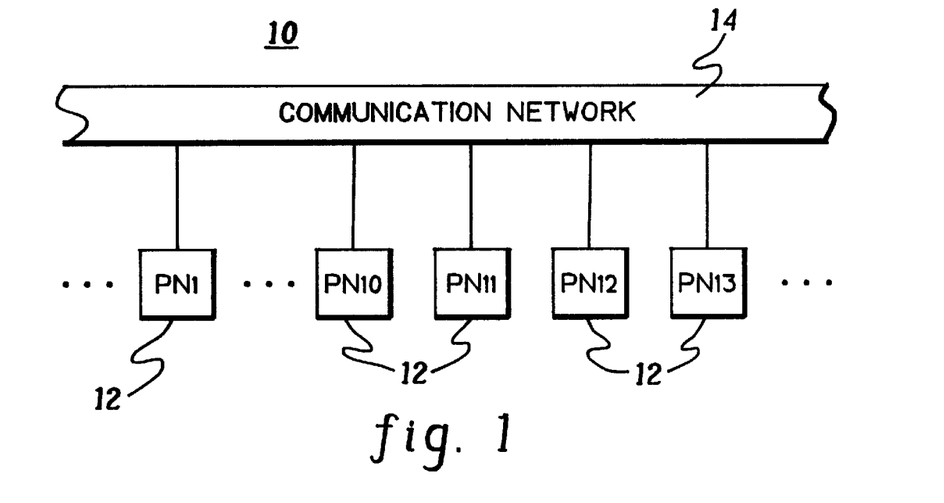
FIG. 1 is a general block diagram of a distributed computing system pursuant to the present invention.
Figure 2:
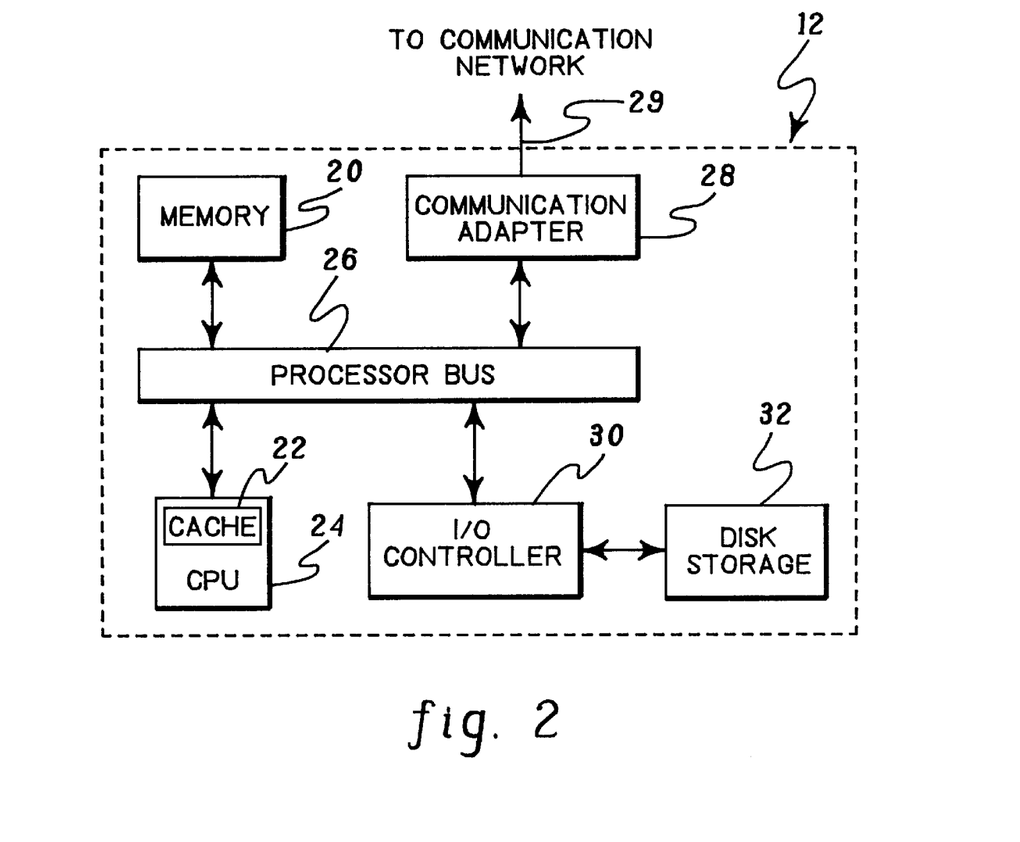
FIG. 2 is a block diagram representation of one embodiment of a processing node of FIG. 1.

In FIG. 1, a distributed computing system, denoted 10, is shown to have a plurality of processing nodes/systems 12 (... PN1 ... PN10, PN11, PN12, PN13 ...) interconnected through a communication network 14. (Each processing node 12 could comprise a physically independent processing system, at least some of which could be geographically remotely disposed.) One processing node 12 embodiment is depicted in FIG. 2. In this typical configuration, node 12 includes a local memory 20, a CPU 24 (including a cache 22), along with a processor bus 26 through which CPU 24, cache 22 and memory 20 interconnect and communicate. Also coupled to bus 26 is a communication adapter 28 which, for example, contains the communication protocols for node 12 to communicate with the other processing nodes in the system, i.e., through the communication network of FIG. 1. Node 12 couples to the communication network (not shown) via connect line 29. Node 12 also contains an I/O controller 30 which interconnects bus 26 and a disk storage 32. Disk storage 32 operates as secondary storage to memory 20.

Important concepts of the present invention are the replicated processing of an application program, sub-program, transaction, etc. (herein referred to as an "instruction set") and the contemporaneous collection of a compressed hardware signature based thereon from each processing node in a multiprocessor system such as that of FIG. 1. Subsequent instruction set processing the collected signatures are compared for the presence or absence of error using a predefined voting scheme. A generalized overview of these processing concepts is presented in FIG. 3.

Figure 3:
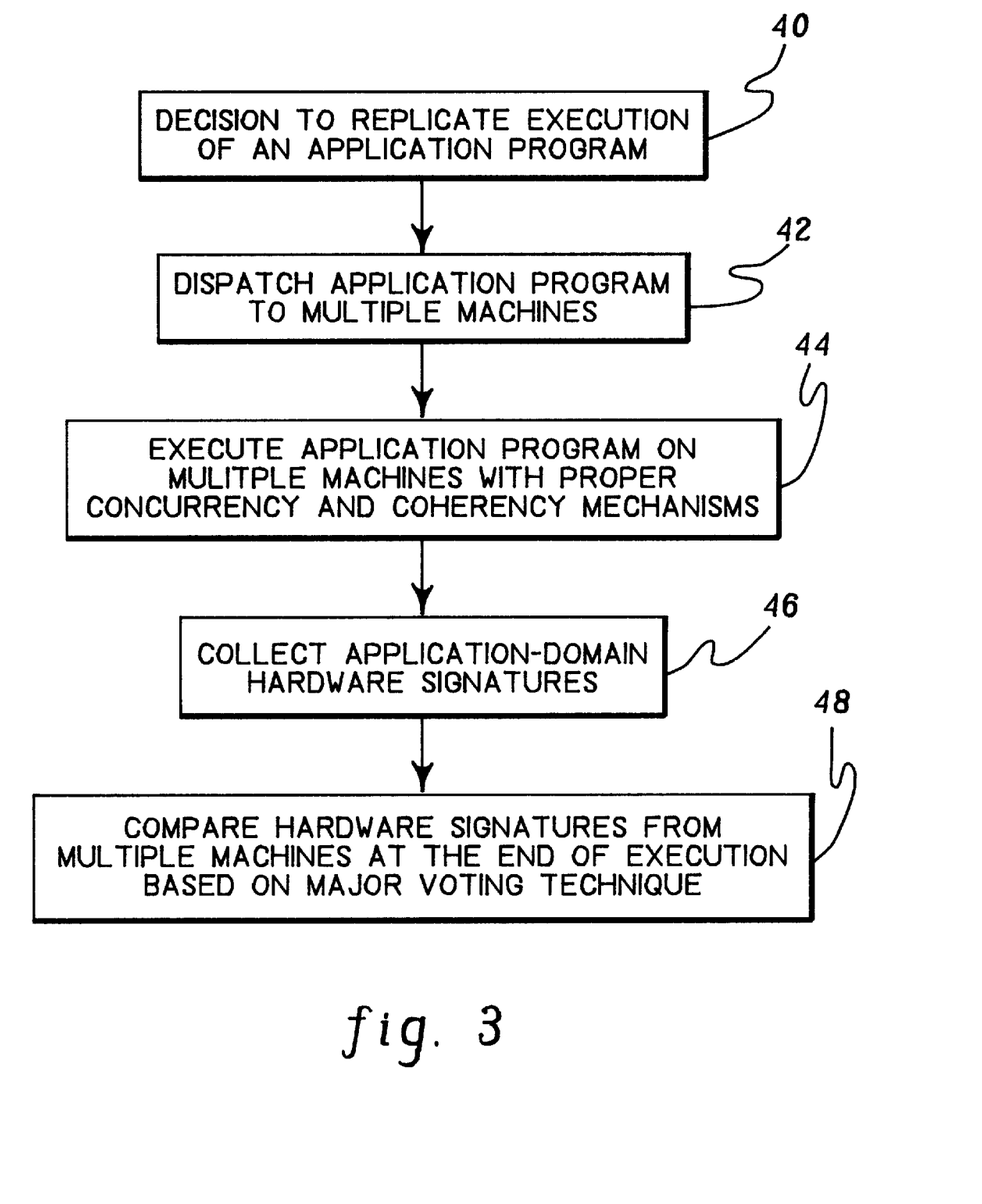
FIG. 3 is a functional flowchart of one embodiment of program processing pursuant to the present invention.

Initially, a decision is made for replicated execution of a selected "instruction set", for example, for fault tolerance or diagnostics, 40 "Decision To Replicate Execution Of An Application Program." Replication of the instruction set can be in duplicate, triplicate or any other desired multiple. Preferably, an odd number of instruction set replications are used to facilitate the signature voting process (described below). Once the replication decision is made for a selected instruction set, the instruct set is dispatched to the desired number of processing machines, 42 "Dispatch Application Program To Multiple Machines," which can be accomplished by a single command if the instruction set is already replicated and coded in each processing machine. Execution thereof on each of the machines can proceed synchronously or asynchronously with proper concurrency and coherency mechanisms, 44 "Execute Application Program On Multiple Machines With Proper Concurrency And Coherency Mechanisms." In a multiple processor environment, coherency and concurrency are needed to ensure data integrity. (This function is typically overseen by a database management system in a transaction processing environment (see below) or by proper hardware functions.)

Pursuant to the present invention, contemporaneous with execution of the application program, an application-domain, compressed hardware signature(s) is collected by each executing machine, 46 "Collect Application-Domain Hardware Signatures." Each collected hardware signature may comprise a compressed signal derived from the resultant data produced from execution of the instructions in the subject instruction set. Upon completion of instruction set execution, hardware signatures from each of the multiple machines are compared using a predefined signature voting scheme (described further below), 48 "Compare Hardware Signatures From Multiple Machines At The End Of Execution Based On Major Voting Technique."

By way of a more specific processing example, a fault-tolerant transaction processing method in accordance with the present invention is next described. In the transaction processing environment, each processing node executes a copy of the database management software which includes a transaction manager. The transaction manager is a software system which ensures proper writing to the database. A "transaction" is defined as a logical unit of work in the application environment and it must be either executed completely or leave the main database unaffected. The database may be replicated and stored at each processing node or remain external to the processing nodes.

Each replicated transaction is executed at a distinct processing node. One detailed example of transaction processing pursuant to the invention is set forth in FIG. 4 and is described below with reference to the multiprocessing system of FIG. 1. In the specific transaction processing embodiment shown, several assumptions are initially made. Specifically, processing node PN1 is assumed to function as the sole database server for the system. Further, computing system PN13 is assumed to initiate transaction replication, with the transaction being defined as a simple database access and update of present account information. A voting scheme of two out of three identical signatures is used.

Figure 4:
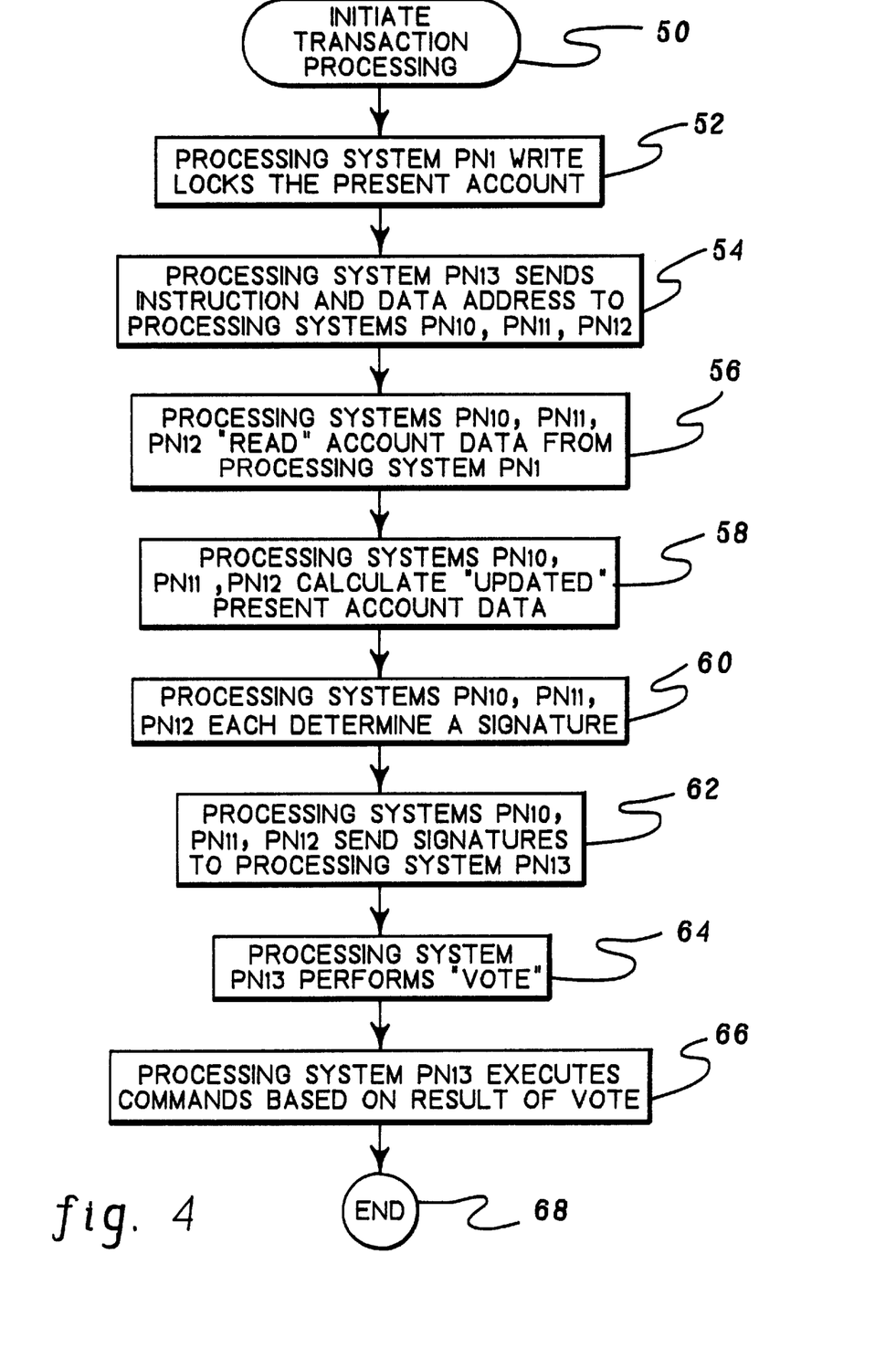
FIG. 4 is a specific example of program processing pursuant to the present invention.

With a decision to replicate execution, 50 "Initiate Transaction Processing," coordinating node (PN13) triggers PN1 to write lock the present account data, 52 "Processing System PN1 Write Locks The Present Account." The transaction is then replicated and sent to other computing nodes, for example, PN10, PN11, PN12, 52 "Processing System PN13 Sends Instruction And Data Address To Processing Systems PN10, PN11, PN12." (In the transaction processing environment a decision to replicate execution is typically accomplished on the transaction level.)

The present account data is then read from node PN1 by the replicated processing machines PN10, PN11 & PN12, 56 "Processing Systems PN10, PN11, PN12 'Read' Account Data From Processing System PN1." By way of example, account data may include the present account number, and deposit/withdrawal information, etc. Next, processing systems PN10, PN11 & PN12 calculate the updated present account data, 58 "Processing Systems PN10, PN11, PN12 Calculate 'Updated' Present Account Data," and each simultaneously collects at least one compressed hardware signature from one or more locations in its processing flow, e.g., subsequent instruction decoding, address generation and/or instruction execution, 60 "Processing Systems PN10, PN11, PN12 Each Determine A Signature."

Upon completion of transaction execution, each processing system PN10, PN11 & PN12 sends its collected, compressed signature(s) from a local collection register(s) to the coordinating node PN13, 62 "Processing Systems PN10, PN11, PN12 Send Signatures To Processing System PN13," which performs the vote operation once all signatures have been received, 64 "Processing System PN13 Performs 'Vote'." Node PN13 ensures process synchronization by waiting until all collected signatures have been received. Finally, coordination node PN13 executes predefined, appropriate commands based upon the result of the performed vote, 66 "Processing System PN13 Executes Commands Based On Result Of Vote," after which transaction processing is terminated, 68 "End." By way of example, an appropriate command may be that if the signatures collected by processing nodes PN10 & PN11 agree, then processing node PN1 is instructed to unlock the present account, instruct processing node PN10 to transmit its resultant data to database manager PN1, and direct node PN1 to update the present account with the computed data.

In the above description, only one processing node is used for voting and one processing node is used to control updating of the present account information. To achieve a higher level of fault-tolerance, multiple processing nodes (e.g., three) could be used for error free voting. Additionally, multiple processing nodes (e.g., three) could be used to control updating of the present account information. By way of example, each processing node PN10, PN11, PN12 could perform the same voting process and each could inform a corresponding update processing node to perform the update on a local copy of the database, i.e., assuming that the outcome of the voting is acceptable.

The present inventive technique is readily implementable in a transaction processing environment since the database is unaffected until a transaction is fully committed. Because of this, a small delay between the time a fault occurs and the time the error is detected is acceptable. As long as the detection occurs before the transaction is committed the transaction manager can force the transaction to abort with no changes being made to the database.

Figure 5:
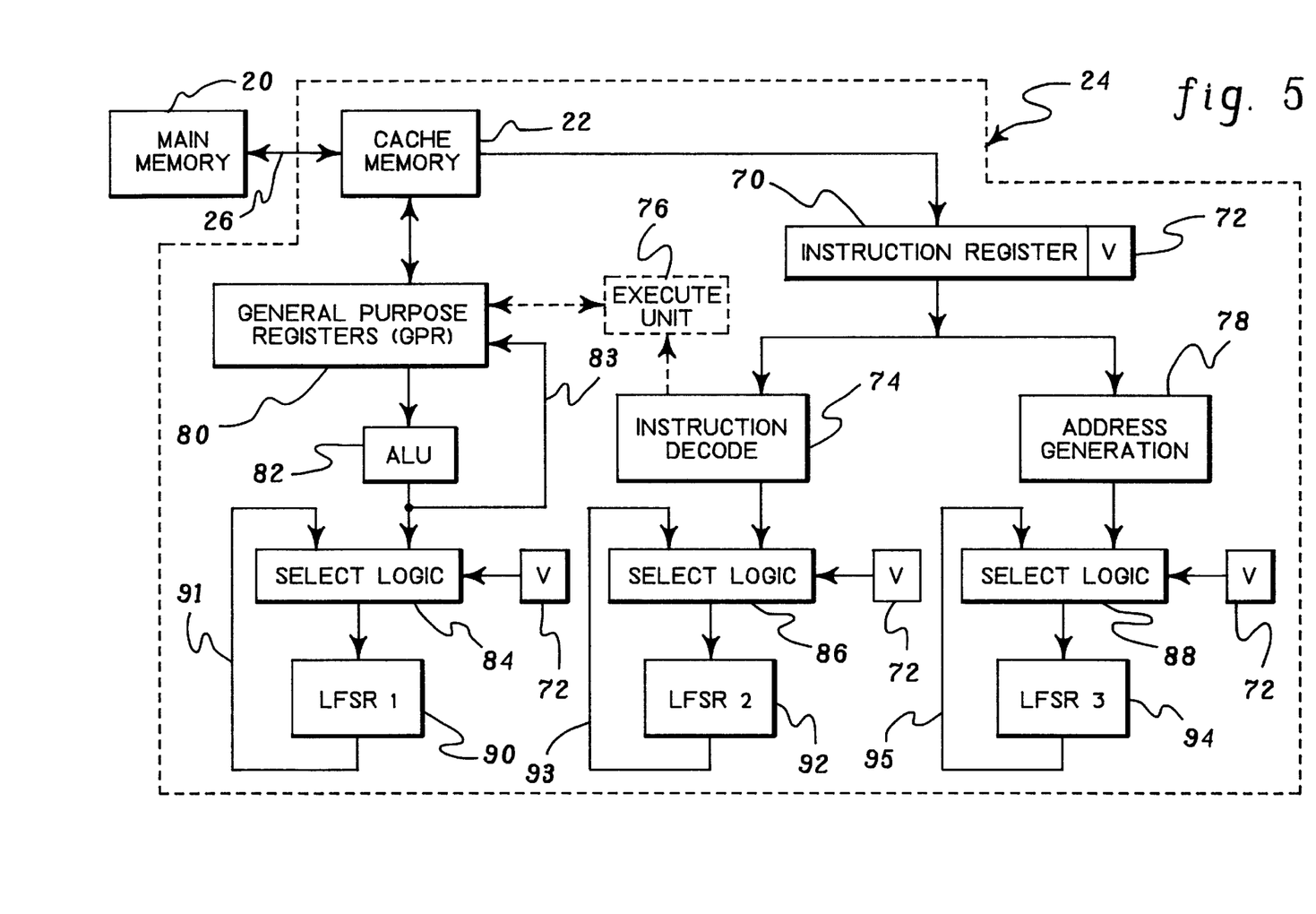
FIG. 5 is a more detailed block diagram of selected components of the processing node of FIG. 2 pursuant to the present invention.

One specific processing node embodiment for hardware signature collection and voting pursuant to the present invention is depicted in the block diagram of FIG. 5. Shown in FIG. 5 are memory 20 and CPU 24 (including cache memory 22) of the typical processing node 12 of FIG. 2. CPU 24 operates on instructions and/or data in cache memory 22, which is coupled to primary memory 20 of the processing node via processor bus 26. In addition to the instruction set to be processed, memory 20 typically contains the input data to the CPU, which may include a partial or complete replication of an external database.

Although any one of a number of known data compression techniques could be used (e.g., maintaining a counter to track the number of executed instructions), signature collection pursuant to the present invention is preferably accomplished using one or more linear feedback shift registers (LFSRs) per processing node. LFSRs are well known in the open literature (e.g., see Rao & Fujiwara, *Error-Control Coding For Computing Systems*, a Prentice Hall Publication, 1989, Section 3.2, (first edition, 1989), which is hereby incorporated herein by reference) and have been used in hardware testing for test response compression (see McCluskey, "Built-In Self-Test Techniques," IEEE Design and Test, Vol. 2, No. 2, pp. 21–28 (April, 1985)). Using a linear feedback shift register compression technique in the present invention advantageously reduces the amount of data to be cross-examined at the voting stage. LFSRs can be used to compress a stream of data and/or control signals involved in the processing of an instruction set at any one of numerous locations internal to the CPU. More particularly, the data signals can be directed from any data path and the control signals from an instruction decode and/or address generation hardware within the CPU (described further below).

Instructions brought into cache memory 22 are sequentially input to CPU 24 at an instruction register 70 which is modified to include a voting control bit 72. Bit 72 is used to signal whether the subject instruction is from a selected instruction set for which signature collection is desired. The voting control bit can be set/reset by the appropriate instructions. Instructions are read from register 70 and decoded by an instruction decode unit 74 which is coupled to an execute unit 76, shown in phantom. In pipeline fashion instructions are also read from register 70 by an address generation unit 78 which provides associated address signals to the storage media. Also coupled for communication with cache memory 22 are general purpose registers (GPRs) 80, which are to hold the present data as processed by CPU 24. Coupled to an output of GPRs 80 is an ALU 82 which feeds resultant data back to registers 80 via connection 83.

In the specific embodiment shown, three separate signature collection devices (LFSRs and their supporting circuitry) per CPU are utilized. Specifically, coupled to the output data path from units 82, 74 & 78 are select logic circuits 84, 86 & 88, respectively. (See the above-incorporated Rao & Fujiwara *Error-Control Coding For Computing Systems* reference.) Vote bit V 72 operates as a control to each select logic circuit 84, 86 & 88. The vote bit is set whenever hardware collection of a signature(s) is required, which again will typically vary with the instruction set under execution. Each logic circuit is reset by the vote bit for each new error testing of an instruction set. The quantity and content of compressed hardware signatures to be collected will vary with particular software/hardware systems.

In the CPU embodiment of FIG. 5, a first signature is collected at LFSR 1 90 which is coupled to receive data from select logic 84. Logic 84 can read LSFR 90 via a feedback connection 91. Similarly, an LFSR 2 92 is coupled to logic 86 and has a feedback connection 93 thereto. LSFR 3 94 receives data from select logic 88 and provides feedback via connection 95. Use of multiple LFSRs per CPU 24 facilitates fault isolation and diagnoses upon error detection. If unnecessary, however, then only one LFSR per processing node could be used to collect a compressed hardware signature. Further, more than three LFSRs could be added to the design. For example, if CPU 24 contains multiple ALUs, an LFSR and supporting select logic circuit could be coupled to each ALU to collect information on each unit's resultant data. Further, LSFRs could be coupled to access several of the data paths surrounding cache memory 22, for example, between memory 22 and instruction register 70, or memory 22 and GPRs 80. (Data transmission from memory 20 to memory 22 is normally protected by well known ECC mechanisms, or by a parity check scheme.) In most implementations, only application-domain signatures will be collected by the LFSRs.

Figure 6:
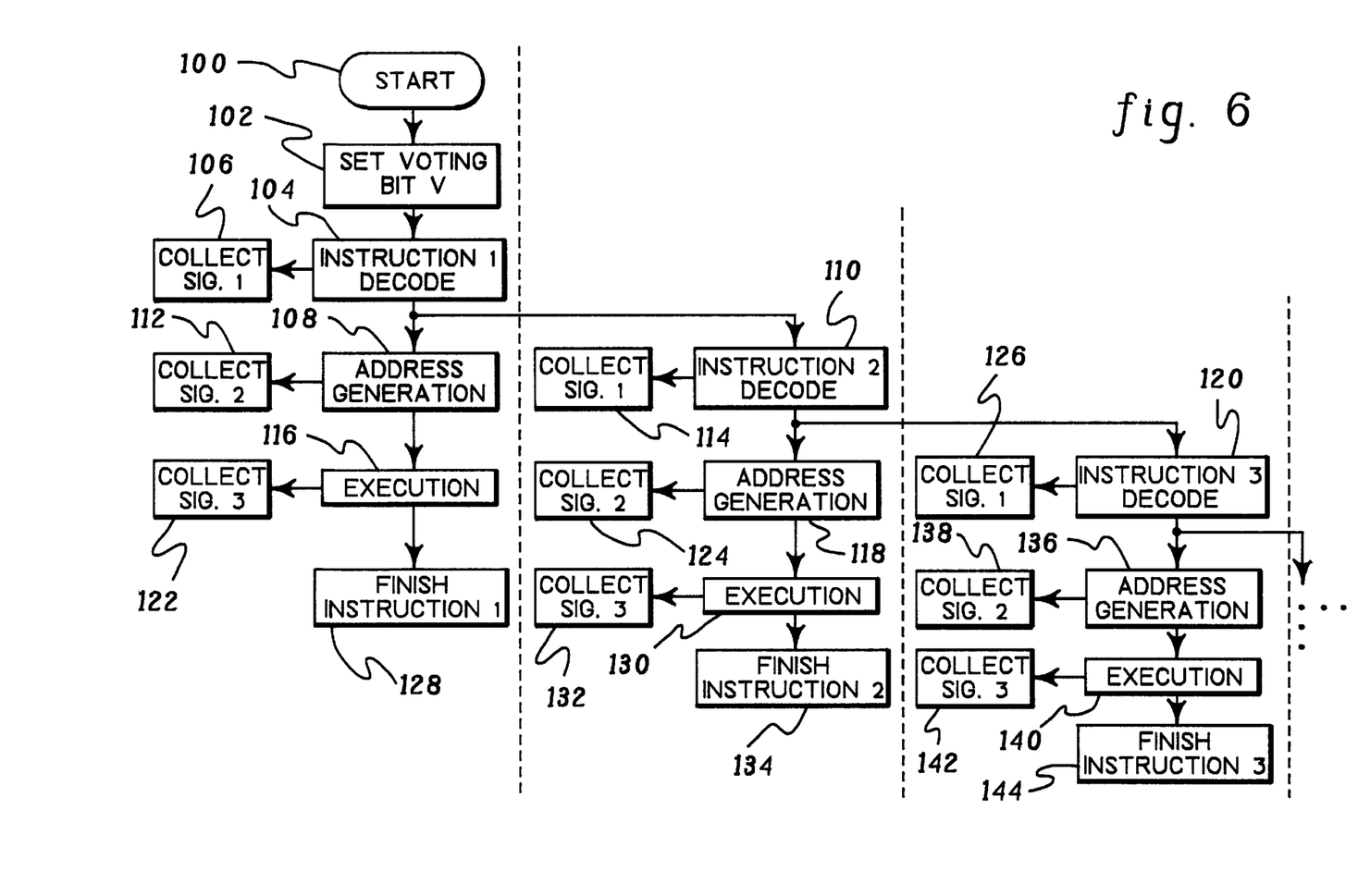
FIG. 6 is a functional diagram of one embodiment of pipeline processing flow through the CPU of FIG. 5.

One "instruction set" processing embodiment using CPU 24 of FIG. 5 is provided in FIG. 6, which depicts a four stage processing pipeline. The pipeline comprises instruction decode, address generation, execution and finish instruction stages. Upon starting processing of an "instruction set" for which error detection is desired, 100 "Start," a set voting bit V control is received, 102 "Set Voting Bit V." The first instruction in the set is decoded, 104 "Instruction 1 Decode," and a compressed signature derived from the decoded instruction is contemporaneously collected in LFSR 1, 106 "Collect SIG. 1." In the next machine cycle, an address is generated 108 "Address Generation," simultaneous with which the fetching and decoding of a second instruction occurs, 110 "Instruction 2 Decode." The output of address generation 108 is collected contemporaneously in compressed form in LFSR 2, 112 "Collect SIG. 2," while the output of instruction 2 decode 110 is added to LFSR 1, 114 "Collect SIG. 1."

With the following machine cycle, a third stage is added to the pipeline wherein instruction one is executed, 116 "Execution," simultaneous with which address generation corresponding to the decoded second instruction occurs, 118 "Address Generation," along with fetching and decoding of a third instruction, 120 "Instruction 3 decode." The operational result from execution 116 is collected in LFSR 3 in compressed form, 122 "Collect SIG. 3," while the address generation 118 and instruction 3 decode 120 results are added in compressed form to LFSR 2 and LFSR 1, respectively, i.e., 124 "Collect SIG. 2" and 126 "Collect SIG. 1."

The last stage in the pipeline is to finish the respective instruction, 128 "Finish Instruction 1," which again occurs during the same machine cycle as the execution, address generation and instruction decoding of the second, third and fourth (not shown) instructions in the "instruction set". A signature based on the operational result from the second executed instruction, 130 "Execution," is collected in LFSR 3, 132 "Collect SIG. 3," after which instruction 2 processing is completed, 134 "Finish Instruction 2." The signature derived from the address generation associated with the third instruction, 136 "Address Generation" is collected in LFSR 2, 138 "Collect SIG. 2," while the signature based on the execution of the third instruction, 140 "Execution," is added to LFSR 3, 142 "Collect SIG. 3." Thereafter, instruction 3 processing is completed, 144 "Finish Instruction 3." To summarize, except for the finish instruction stage, a hardware signature is generated and collected (added) in one of the three LFSRs of the CPU in each stage of the pipelined process. Note, however, certain instructions to be executed do not require all four stages. In such a case, a corresponding signature will not be collected for any absent stage.

At the end of program execution, and prior to the database commit point, a machine instruction check can be issued by the coordinating processing node for each slave processing system to send its current hardware signature (i.e., content of its one or more LFSRs) to the coordinating processing node for comparison (see FIG. 3). If the signatures fail to agree, then an error is identified and the instruction set manager aborts the program. It should be observed that this scheme performs only one vote per instruction set and consequently the amount of compression and communication necessary is reduced significantly in comparison with prior art error detection approaches which typically require the combination of all data results.

For clarity, it is assumed in the above-described embodiment that each processing node executes an instruction set according to a sequential order. In an advanced superscalar-type of processor, out-of-sequence execution is typically allowed. In such an environment, the signature collection mechanism will need to be modified. For example, a signature could be collected only at the decode and the finish stages since these two stages are normally performed in sequence. In such a case, the data produced by the address generation stage and the execution stage may be buffered according to the decode sequence and subsequent completion of instruction execution, signature collection could be performed.

Figure 7:
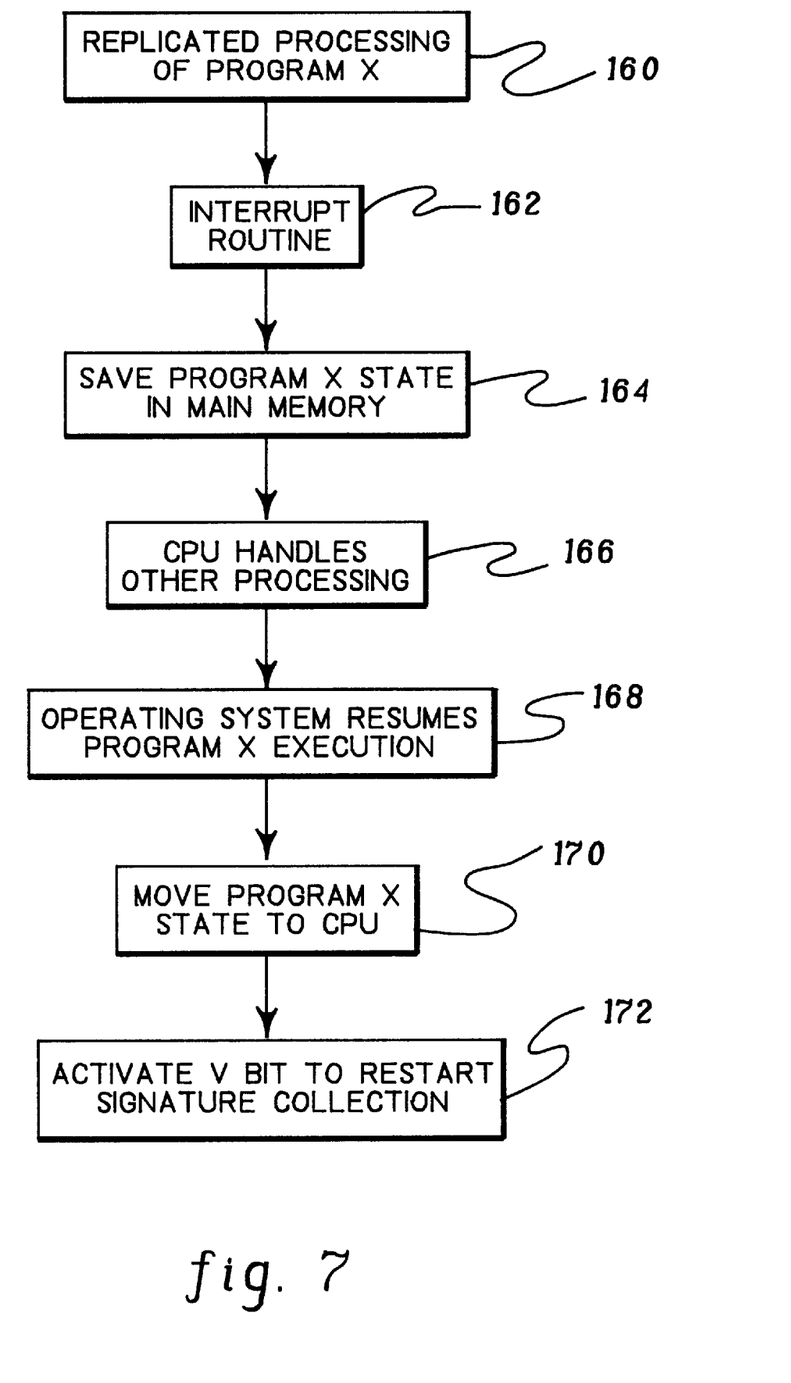
FIG. 7 is a functional flowchart of one embodiment of the present invention executed in a multiprogram multiple processing environment.

In practice, most multiprocessor systems execute application programs in a multi-programming environment. Essentially, application program execution can be repeatedly interrupted and then returned to before execution of the subject instruction set is completed. The present invention can be easily implemented in such a multiprogramming environment through a simple saving of the hardware signature and control bit V whenever interruption occurs and then a restoring of this information when program execution resumes. In doing so, the correctness of the signatures will be preserved. One implementation of this multiprogramming processing concept is depicted in FIG. 7.

In the multiprocessor environment, replicated processing of a selected "instruction set" (e.g., program X) is initially assumed, 160 "Replicated Processing Of Program X." Because the program is being executed in a multiprogram processing environment, its execution will typically be interrupted at one or more processing points, 162 "Interrupt Routine." As part of the interrupt processing, the present state of program X is saved in main memory 164 "Save Program X State In Main Memory," which pursuant to the invention is to include the content from the respective hardware signature collection devices (LFSRs) and the associated vote bit. Each processing system then processes one or more different programs, 166 "CPU Handles Other Processing," which may possibly comprise one or more different application programs with their own signature collection requirements. At some point, program X execution will be resumed, 168 "Operating System Resumes Program X Execution," and the current state of program x including the respective contents of the signature collection devices (LFSRs) are restored to the appropriate hardware (LFSRs) in the CPU, 170 "Move Program X State To CPU." Lastly, the vote control bit V is reactivated, 172 "Activate V Bit To Restart Signature Collection," and processing of the selected instruction set resumes with signature collection.

It should be observed from the above discussion that a novel error detection scheme for a multiple processing system is provided. The fault-tolerant system described utilizes compressed signature collection and voting techniques so that only one vote per instruction set is necessary to ensure process integrity. Consequently, the amount of comparison and communication overhead required is reduced significantly in comparison with prior techniques. Further, the loosely coupled asynchronous multiprocessor system presented diminishes the probability of a time-correlated failure occurring since processors are executing transactions at slightly different times. In particular, there is no common clock which could expose the system to a single-point failure. Lastly, error detection based on an "instruction set" provides superior error identification efficiency in comparison with that provided by a chip-level error detection approach.

While the invention has been described in detail herein in accordance with certain preferred embodiments thereof, many modifications and changes therein may be affected by those skilled in the art. For example, the fault-tolerant processing technique described herein could be readily adapted to diagnostics testing. In such a case, an application program would be run on a control system and a test system with the collected signatures being compared to verify that the test system is operating properly. Other applications will suggest themselves to those skilled in the art. Accordingly, it is intended by the appended claims to cover all such modifications and changes as fall within the true spirit and scope of the invention.

What is claimed is:

1. A multiprocessor computer system with error detection capability for processing multiple instruction sets, each instruction set of said multiple instruction sets comprising a plurality of instructions, said multiprocessor computer system comprising:

a plurality of processors, each processor independently and asynchronously processing at least some of said multiple instruction sets from the other of said plurality of processors;

a plurality of hardware signature generation means, each hardware signature generation means being associated with a respective processor of said plurality of processors for generating a compressed hardware signature contemporaneous with and substantially uniquely corresponding to said respective processor's processing of a selected instruction set of said multiple instruction sets;

selection means for identifying said selected instruction set for comparison of respective compressed hardware signatures from at least two hardware signature generation means of said plurality of hardware signature generation means; and voting means coupled to receive each of said respective compressed hardware signatures for comparing said signatures for an error condition, an error condition being identified if a predefined comparison failure is detected between the received compressed hardware signatures.

2. The multiprocessor computer system of claim 1, wherein said plurality of processors comprises a plurality of microprocessors.

3. The multiprocessor computer system of claim 1, wherein said plurality of processors are coupled in parallel through a communication network for asynchronous parallel processing of said multiple instruction sets.

4. The multiprocessor computer system of claim 1, wherein said plurality of processors comprises three processors.

5. The multiprocessor computer system of claim 4, wherein said three processors are coupled in parallel through a communication network for asynchronous parallel processing of said multiple instruction sets.

6. The multiprocessor computer system of claim 1, wherein at least some of said plurality of processors reside in physically independent processing systems.

7. The multiprocessor computer system of claim 6, wherein at least some of said physically independent processing systems comprise physically remote processing systems.

8. The multiprocessor computer system of claim 1, wherein each processor of said plurality of processors is driven by a clock signal, and at least some of said plurality of processors are driven by different, asynchronous clock signals.

9. The multiprocessor computer system of claim 1, wherein each processor independently and asynchronously processes each of said multiple instruction sets from the other of said plurality of processors.

10. The multiprocessor computer system of claim 1, wherein said system further comprises:

a processing interrupt means for interrupting processing of said multiple instruction sets through said plurality of processors; and storage means coupled to said plurality of hardware signature generation means for receiving the present state of each hardware signature generation means upon processing interruption of the multiple instruction sets.

11. The multiprocessor computer system of claim 1, wherein each of said plurality of hardware signature generation means includes at least one LFSR.

12. The multiprocessor computer system of claim 11, wherein said selection means is coupled to said at least one LFSR of each hardware signature generation means for identifying said selected instruction set for hardware signature collection.

13. The multiprocessor computer system of claim 1, wherein said voting means comprises a coordination processor coupled to receive each of said respective compressed hardware signatures.

14. The multiprocessor computer system of claim 1, wherein each instruction set of said multiple instruction sets comprises a transaction.

15. A method for processing multiple instruction sets utilizing multiple processing systems, each instruction set of said multiple instruction sets comprising a plurality of instructions, said processing method comprising the steps of:

(a) asynchronously processing said multiple instruction sets on each of said multiple processing systems;

(b) identifying a selected instruction set of said multiple instruction sets;

(c) collecting a compressed hardware signature from each of said processing systems, each of said compressed hardware signatures substantially uniquely corresponding to the respective system's processing of said selected instruction set of said multiple instruction sets; and (d) subsequent to said signature collecting step (c), voting based upon said collected compressed hardware signatures to identify the presence or absence of a process error condition in one or more of said multiple processing systems.

16. The processing method of claim 15, wherein said compressed hardware signature collecting step (c) occurs at each of said multiple processing systems commensurate with said step (a) processing of said multiple instruction sets therethrough.

17. The processing method of claim 16, wherein a coordination processing system is provided to accomplish said voting step (d) and wherein said method further includes the step of communicating subsequent to said collecting step (c), each of said compressed hardware signatures to said coordination processing system.

18. The processing method of claim 16, further comprising the step of exchanging said hardware signatures collected in said step (c) such that each processing system contains the compressed hardware signatures generated by the other processing systems of said multiple processing systems, at least one of said multiple processing systems accomplishing said voting step (d).

19. The processing method of claim 15, wherein said multiple processing systems comprise three processing systems and said step (a) further comprises the step of replicating said multiple instruction sets for processing through each of said three processing systems.

20. The processing method of claim 15, wherein said collecting step (c) and said voting step (d) are accomplished independently for each selected instruction set.

21. The processing method of claim 20, wherein said method further comprises the steps of:
  interrupting processing of said selected instruction set through said multiple processing system; and
  storing the present state of each collected compressed hardware signature contemporaneous with interruption of processing of said selected instruction set.

22. A data processing system with process error detection capability for processing of an instruction set and input data, said instruction set comprising a plurality of instructions, said system comprising:
  a plurality of processors operating asynchronously with respect to each other, each processor being coupled to receive said instruction set and to access said input data, each processor having at least:
    (i) an instruction decoder for decoding instructions of said plurality of instructions of said instruction set and generating control signals therefrom,
    (ii) an arithmetic logic unit (ALU) coupled to receive at least some of said generated control signals from said instruction decoder and access said input data, said ALU generating a plurality of resultant data signals in response to said received control signals and said accessed input data, and
    (iii) means for generating a compressed hardware signature, said signature being generated at least in part by compressing said plurality of resultant data signals output from said ALU, wherein said compressed hardware signature substantially uniquely corresponds to said plurality of resultant data signals output from said ALU, said signature generating means further including selection means for identifying said instruction set for compressed hardware signature collection;
  communication means interconnecting each processor of said plurality of processors;
  signaling means for signaling each of said plurality of processors to transmit collected hardware signatures to said communications means subsequent to processing of said instruction set; and
  voting means coupled to said communication means for receiving and comparing said hardware signatures generated by said plurality of processors to identify the presence or absence of a process error.

23. The data processing system of claim 22, wherein said plurality of processors comprises a plurality of microprocessors.

24. The data processing system of claim 23, wherein each processor of said plurality of microprocessors is driven by a clock signal, at least some of said plurality of processors being driven by different, asynchronous clock signals, and wherein said signaling means coordinates processings from said plurality of processors by waiting until each processor has completed processing of said instruction set before signaling said processors to transmit said collected hardware signatures.

25. The data processing system of claim 22, wherein each processor has multiple ALUs and multiple means for generating a compressed hardware signature, each of said generating means being associated with one of said ALUs.

26. The data processing system of claim 22, wherein each processor includes multiple signature generating means for generating a compressed hardware signature, at least one of said signature generating means of each processor being associated with its instruction decoder for generating a signature based on said control signals generated therefrom.

27. The data processing system of claim 26, wherein said signature generating means of each processor includes an LFSR.

28. The data processing system of claim 27, wherein said selection means is coupled to said LFSR for identifying said instruction set for hardware signature collection.

29. The data processing system of claim 22, wherein said voting means comprises a coordination processor coupled to receive each of said generated hardware signatures.

30. The data processing system of claim 22, wherein said computer system processes multiple instruction sets and wherein each signature generating means of each processor operates in conjunction with a selected one of said multiple instruction sets.

31. The data processing system of claim 30, wherein said system further comprises:
  a processing interrupt means for interrupting processing of the selected instruction set through said plurality of processors; and
  storage means associated with each of said plurality of processors for receiving a present state of each processor's hardware signature generation means upon processing interruption of the selected instruction set.

32. A data processing system with process error detection capability for processing a transaction, said transaction comprising a plurality of instructions, said system comprising:
  a plurality of processors operating asynchronously with respect to each other, each processor being coupled to process said transaction, each processor having at least:
    (i) an instruction decoder for decoding instructions of said plurality of instructions, said instructions being associated with said transaction and generating control signals therefrom,
    (ii) an arithmetic logic unit (ALU) coupled to receive at least some of said generated control signals from said instruction decoder and access said input data, said ALU generating a plurality of resultant data signals in response to said received control signals and said accessed input data, and
    (iii) an LFSR for generating a compressed hardware signature, said signature being generated at least in part by compressing said plurality of resultant data signals output from said ALU, wherein said compressed hardware signature substantially uniquely corresponds to said plurality of resultant data signals output from said ALU, and wherein each of said multiple signature generating means further including selection means for identifying said transaction for compressed hardware signature comparison;
  communication means interconnecting said plurality of processors;
  signaling means for signaling each processor of said plurality of processors to transmit the collected compressed hardware signature to said communication means subsequent to processing of said transaction; and voting means coupled to said communication means for receiving and comparing said compressed hardware signatures generated by said plurality of processors to identify the presence or absence of a process error.

33. The data processing system of claim 32, wherein said plurality of processors comprises a plurality of microprocessors.

34. The data processing system of claim 32, wherein at least some of said plurality of processors are driven by different, asynchronous clock signals, and wherein said signaling means includes means for coordinating processings of said plurality of processors by waiting until each processor has completed processing of said transaction before signaling said plurality of processors to transmit said collected hardware signatures.

35. The data processing system of claim 32, wherein each processor of said plurality of processors has multiple ALUs and multiple LFSRs, each LFSR of said multiple LFSRs being associated with one ALU of said multiple ALUs, and each LFSR of said multiple LFSRs generating a compressed hardware signature.

36. The data processing system of claim 32, wherein each processor of said plurality of processors includes multiple LFSRs, at least one LFSR of said multiple LFSRs of each processor being associated with said processor's instruction decoder for generating a signature based on said control signals generated therefrom.

37. The data processing system of claim 36, wherein said selection means of each processor of said plurality of processors is coupled to said multiple LFSRs for identifying said transaction for hardware signature collection.

38. The data processing system of claim 32, wherein said voting means comprises a coordination processor coupled to receive said compressed hardware signatures.

39. The data processing system of claim 32, further comprising means for aborting said transaction when said voting means identifies the presence of a process error.

40. The data processing system of claim 32, wherein each processor of said plurality of processors further includes a cache memory with multiple data paths coupled thereto, and multiple LFSRs, a first LFSR of said multiple LFSRs being connected to a first data path of said multiple data paths coupled to said cache memory, said first LFSR generating a first compressed hardware signature.

41. The data processing system of claim 40, wherein each processor of said plurality of processors further includes a main memory, and wherein a second data path of said multiple data paths coupled to said cache memory is connected to said main memory, and a second LFSR of said multiple LFSRs is connected to the second data path for generating a second compressed hardware signature.

42. The data processing system of claim 40, wherein each processor of said plurality of processors further includes an instruction register, and wherein a third data path of said multiple data paths coupled to said cache memory is connected to said instruction register, and a third LFSR of said multiple LFSRs is connected to the third data path for generating a third compressed hardware signature.

43. The data processing system of claim 40, wherein each processor of said plurality of processors further includes a general purpose register, and wherein a fourth data path of said multiple data paths coupled to said cache memory is connected to said general purpose register, and a fourth LFSR of said multiple LFSRs is connected to the fourth data path for generating a fourth compressed hardware signature.

44. The data processing system of claim 32, wherein each processor of said plurality of processors further includes address generation hardware with multiple data paths coupled thereto, and multiple LFSRs, at least one LFSR of said multiple LFSRs being coupled to a first data path of said multiple data paths coupled to said address generation hardware for generating the compressed hardware signature.

45. A method for processing multiple transactions utilizing multiple processing systems, each transaction of said multiple transactions comprising a plurality of instructions, said processing method comprising the steps of:
   (a) asynchronously processing said multiple transactions on each of said multiple processing systems;
   (b) identifying a selected transaction of said multiple transactions;
   (c) collecting a compressed hardware signature from each of said processing systems, each of said multiple processing systems utilizing at least one LFSR in collecting said compressed hardware signature, each compressed hardware signature substantially uniquely corresponding to the respective processing system's processing of said selected transaction of said step (b); and
   (d) subsequent to said signature collecting step (c), voting based upon collected compressed hardware signatures to identify the presence or absence of a process error condition in one or more of said multiple processing systems.

46. The processing method of claim 45, wherein said compressed hardware signature collecting step (c) occurs at each processing system of said multiple processing systems commensurate with said step (a) processing of said multiple transactions therethrough.

47. The processing method of claim 46, wherein a coordination processing system is provided to accomplish said voting step (d) and wherein said method further includes the step of communicating, subsequent to said collecting step (c), each of said compressed hardware signatures to said coordination processing system.

48. The processing method of claim 47, further comprising the step of exchanging said compressed hardware signatures collected in said step (c) such that each processing system receives the compressed hardware signatures generated by the other processing systems of said multiple processing systems, at least one of said multiple processing systems accomplishing said voting step (d).

49. The processing method of claim 45, wherein said multiple processing systems comprise three processing systems and said step (a) further comprises the step of replicating said transaction for processing through each of said three processing systems.

50. The processing method of claim 45, wherein said collecting step (c) and said voting step (d) are accomplished independently for the selected transaction.

51. The processing method of claim 45, wherein said method further comprises the steps of:
   interrupting processing of the selected transaction through said multiple processing systems; and
   storing the present state of each collected compressed hardware signature contemporaneous with interruption of processing of said selected transaction.

52. A multiprocessor computer system with error detection capability for processing of an instruction set, said instruction set comprising multiple instructions, said multiprocessor computer system comprising:

- a plurality of processors, each processor independently and asynchronously processing said instruction set from the other of said plurality of processors;
- a plurality of hardware signature generation means, each hardware signature generation means being associated with a respective processor of said plurality of processors for generating a compressed hardware signature contemporaneous with and substantially uniquely corresponding to said respective processor's processing of a said instruction set; and
- voting means coupled to receive each of said respective compressed hardware signatures for comparing said signatures for an error condition, an error condition being identified if a predefined comparison failure is detected between the received compressed hardware signatures.

53. A method for processing an instruction set utilizing multiple processing systems, said instruction set comprising multiple instructions said processing method comprising the steps of:

(a) asynchronously processing said instruction set on each of said multiple processing systems;

(b) collecting a compressed hardware signature from each of said processing systems, each of said compressed hardware signatures substantially uniquely corresponding to the respective system's processing of said instruction set; and (c) subsequent to said signature collecting step (b), voting based upon said collected compressed hardware signatures to identify the presence of absence of a process error condition in one or more of said multiple processing systems.

* * * * *